United States Patent
Baruch et al.

(10) Patent No.: US 10,140,039 B1
(45) Date of Patent: Nov. 27, 2018

(54) I/O ALIGNMENT FOR CONTINUOUS REPLICATION IN A STORAGE SYSTEM

(71) Applicant: EMC IP Holding Company LLC, Hopkinton, MA (US)

(72) Inventors: Leehod Baruch, Rishon Leziyon (IL); Assaf Natanzon, Tel Aviv (IL); Philip Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 17 days.

(21) Appl. No.: 15/379,923

(22) Filed: Dec. 15, 2016

(51) Int. Cl.
  *G06F 12/10* (2016.01)
  *G06F 3/06* (2006.01)

(52) U.S. Cl.
  CPC ............ *G06F 3/0619* (2013.01); *G06F 3/065* (2013.01); *G06F 3/0665* (2013.01); *G06F 3/0689* (2013.01)

(58) Field of Classification Search
  CPC ..... G06F 3/0619; G06F 3/0665; G06F 3/0689
  USPC ......................................................... 711/114
  See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |

(Continued)

OTHER PUBLICATIONS

U.S. Appl. No. 15/274,362, filed Sep. 23, 2016, Baruch, et al.

(Continued)

*Primary Examiner* — Jae U Yu
(74) *Attorney, Agent, or Firm* — Daly, Crowley Mofford & Durkee, LLP

(57) ABSTRACT

Described embodiments provide systems and methods for operating a storage system. A plurality of storage segments of a production volume of the storage system are identified. Write requests to be written to the production volume are received during an operating time window. An alignment of the received write requests to one or more of the plurality of segments of the production volume is determined. For write requests that are not aligned to the one or more of the plurality of segments of the production volume, snapshot replication is performed. For write requests that are aligned to the one or more of the plurality of segments of the production volume, continuous replication is performed.

19 Claims, 7 Drawing Sheets

(56) References Cited

U.S. PATENT DOCUMENTS

| | | |
|---|---|---|
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |

(56) References Cited

U.S. PATENT DOCUMENTS

| | | |
|---|---|---|
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 2014/0195640 A1 | 7/2014 | Kaiser et al. |
| 2015/0066857 A1* | 3/2015 | Dayal ............... G06F 17/30088 707/639 |
| 2016/0139836 A1 | 5/2016 | Nallathambi et al. |

OTHER PUBLICATIONS

EMC Corporation, "EMC Recoverpoint/EX;" Applied Technology; White Paper; Apr. 2012; 17 Pages.

U.S. Non-Final Office Action dated Apr. 9, 2018 for U.S. Appl. No. 15/274,362; 15 Pages.

Response to U.S. Non-Final Office Action dated Apr. 9, 2018 for U.S. Appl. No. 15/274,362; Response filed Jun. 26, 2018; 13 pages.

U.S. Non-Final Office Action dated Apr. 9, 2018 for U.S. Appl. No. 15/274,362; 14 pages.

* cited by examiner

| Region 1 | Dirty Indicator 1 |
| Region 2 | Dirty Indicator 2 |
| Region 3 | Dirty Indicator 3 |
| ... | ... |
| Region N | Dirty Indicator N |

FIG. 6B
601

| Unaligned (snap) range 1 | |
| Starting offset 1 | Ending offset 1 |

| Unaligned (snap) range 2 | |
| Starting offset 2 | Ending offset 2 |

...

| Unaligned (snap) range N | |
| Starting offset N | Ending offset N |

US 10,140,039 B1

I/O ALIGNMENT FOR CONTINUOUS REPLICATION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect may provide a method for operating a storage system. In embodiments, a plurality of storage segments of a production volume of the storage system may be identified. In some embodiments, write requests to be written to the production volume may be received during an operating time window. An alignment of the received write requests to one or more of the plurality of segments of the production volume may be determined. In embodiments, for write requests that are not aligned to the one or more of the plurality of segments of the production volume, snapshot replication may be performed. For write requests that are aligned to the one or more of the plurality of segments of the production volume, continuous replication may be performed.

Another aspect provides a system that may include a processor and memory storing computer program code that when executed on the processor causes the processor to operate a storage system. In embodiments, the storage system may be operable to perform the operations of identifying a plurality of storage segments of a production volume of the storage system. In some embodiments, write requests to be written to the production volume may be received during an operating time window. An alignment of the received write requests to one or more of the plurality of segments of the production volume may be determined. In embodiments, for write requests that are not aligned to the one or more of the plurality of segments of the production volume, snapshot replication may be performed. For write requests that are aligned to the one or more of the plurality of segments of the production volume, continuous replication may be performed.

Another aspect provides a computer program product including a non-transitory computer readable storage medium having computer program code encoded thereon that when executed on a processor of a computer causes the computer to operate a storage system. In embodiments, the computer program product includes computer program code for identifying a plurality of storage segments of a production volume of the storage system. Write requests to be written to the production volume may be received during an operating time window. In embodiments, an alignment of the received write requests to one or more of the plurality of segments of the production volume may be determined. For write requests that are not aligned to the one or more of the plurality of segments of the production volume, snapshot replication may be performed. In embodiments, for write requests that are aligned to the one or more of the plurality of segments of the production volume, continuous replication may be performed.

BRIEF DESCRIPTION OF THE DRAWING FIGS.

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 6A is a block diagram showing a dirty data tracking bitmap, in accordance with an illustrative embodiment;

FIG. 6B is a block diagram showing a dirty data tracking structure, in accordance with an illustrative embodiment.

DETAILED DESCRIPTION

Before describing concepts, structures, and techniques, some terms are explained. As used herein, the term "I/O request" or simply "I/O" may refer to an input or output request, for example a data read or a data write request. The term "storage system" may encompass physical computing systems, cloud or virtual computing systems, or a combination thereof. The term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN), etc.). The term "storage device" may also refer to a storage array including multiple storage devices.

Figure 1:
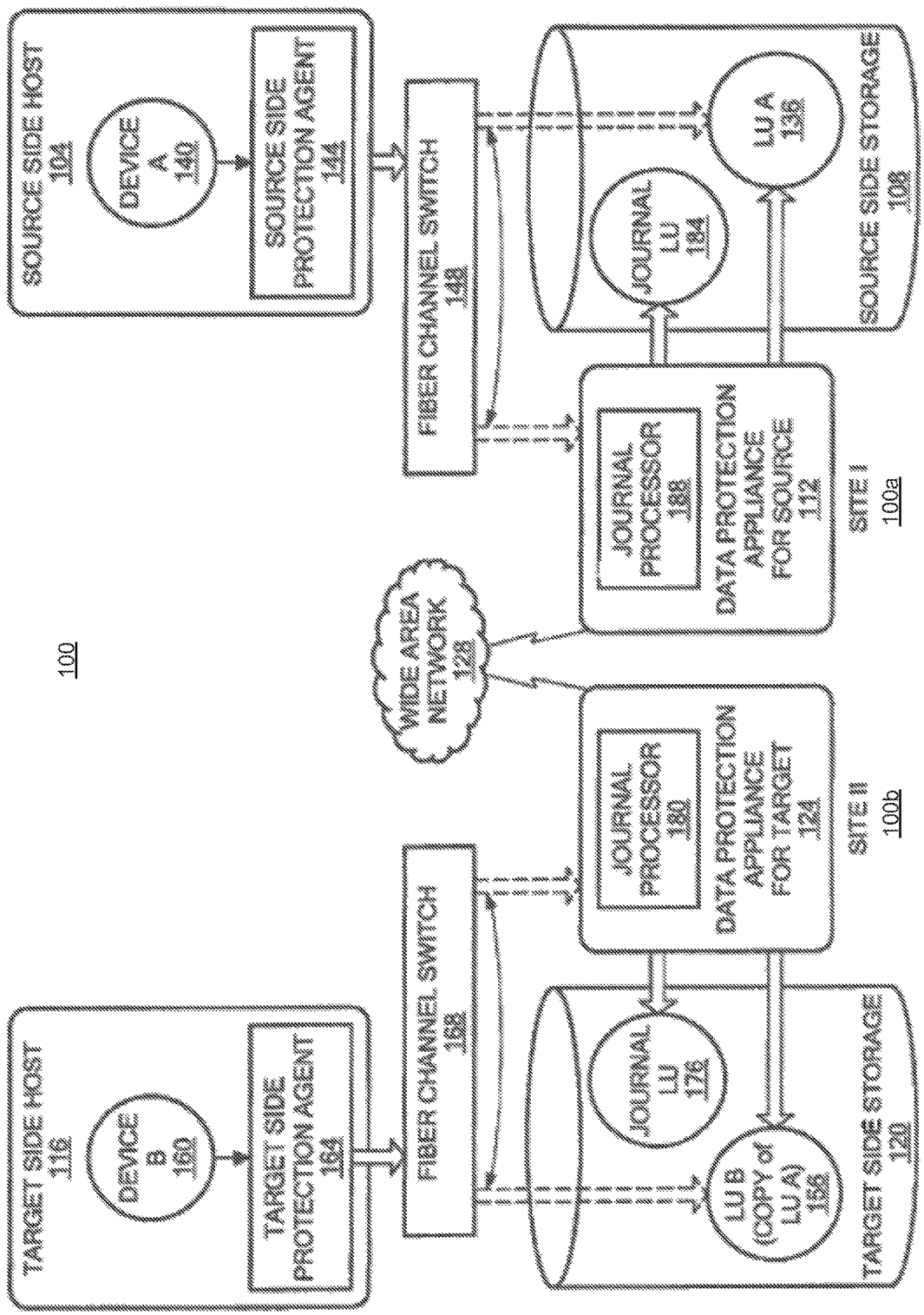
FIG. 1 is a block diagram of a data protection system, in accordance with an illustrative embodiment.

Referring to the illustrative embodiment shown in FIG. 1, data protection system 100 may include two sites, Site I 100a and Site II 100b, which communicate via a wide area network (WAN) 128, such as the Internet. In some embodiments, under normal operation, Site I 100a may correspond to a source or production site (i.e., the transmitter within a data replication workflow) of system 100 and Site II 100b may be a target or replication site (i.e., the receiver within a data replication workflow) of data protection system 100. Thus, during normal operations, the direction of replicated data flow may be from Site I 100a to Site II 100b.

In certain embodiments, Site I 100a and Site II 100b may be remote from one another. In other embodiments, Site I 100a and Site II 100b may be local to one another and may be connected via a local area network (LAN). Local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. For example, Site I 100a may behave as a target site and Site II 100b may behave as a source site. Failover may be triggered either manually (e.g., by a user) or automatically and may be performed in the event of a disaster at Site I 100a. In some embodiments, both Site I 100a and Site II 100b may behave as source site for some stored data and may behave simultaneously as a target site for other stored data. A portion of stored data may be replicated from one site to the other, and another portion may not be replicated.

Site I 100a may correspond to a production site (e.g., a facility where one or more hosts run data processing applications that write data to a storage system and read data from the storage system) and Site II 100b may correspond to a backup or replica site (e.g., a facility where replicated production site data is stored). In such embodiments, Site II 100b may be responsible for replicating production site data and may enable rollback of data of Site I 100a to an earlier point in time. Rollback may be used in the event of data corruption of a disaster, or alternatively in order to view or to access data from an earlier point in time.

As shown in FIG. 1, Site I 100a may include a source host 104, a source storage system (or "storage array") 108, and a source data protection appliance (DPA) 112 coupled via a first storage area network (SAN). Similarly, Site II 100b may include a target host 116, a target storage system 120, and a target DPA 124 coupled via a second SAN. In some embodiments, each SAN may include one or more devices (or "nodes") that may be designated an "initiator," a "target", or both. For example, the first SAN may include a first fiber channel switch 148 and the second SAN may include a second fiber channel switch 168. Communication links between each host 104 and 116 and its corresponding storage system 108 and 120 may be any appropriate medium suitable for data transfer, such as fiber communication channel links. A host may communicate with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

Each storage system 108 and 120 may include storage devices for storing data, such as disks or arrays of disks. Storage systems 108 and 120 may be target nodes. In order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. An LU is a logical entity provided by a storage system for accessing data stored therein. A logical unit may be a physical logical unit or a virtual logical unit, and may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. As such, LU B 156 may be generated as a copy of LU A 136. In one embodiment, LU B 156 may be configured so that its size is identical to the size of LU A 136.

Source host 104 may generate a host device 140 ("Device A") corresponding to LU A 136 and source host 116 may generate a host device 160 ("Device B") corresponding to LU B 156. A host device may be a logical entity within a host through which the host may access an LU. In some embodiments, an operating system of a host may generate a host device for each LU exposed by the storage system in the host SAN.

Source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

Source DPA 112 and target DPA 124 may perform various data protection services, such as data replication of a storage system, and journaling of I/O requests issued by hosts 104 and/or 116. When acting as a target DPA, a DPA may also enable rollback of data to an earlier point-in-time (PIT), and enable processing of rolled back data at the target site. In sonme embodiments, each DPA 112 and 124 may be a physical device, a virtual device, or may be a combination of a virtual and physical device.

In some embodiments, a DPA may be a cluster of such computers. Use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. The DPA cluster leader may coordinate between the computers in the cluster, and may also perform other tasks that require coordination between the computers, such as load balancing.

In certain embodiments, a DPA may be a standalone device integrated within a SAN. Alternatively, a DPA may be integrated into storage system. The DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, the DPAs may issue I/O requests using, for example, SCSI commands, to access LUs on their respective storage systems. Each DPA may also be configured with the necessary functionality to act as targets, e.g., to reply to I/O requests, such as SCSI commands, issued by other initiators in the SAN, including their respective hosts.

In some embodiments, being target nodes, the DPAs may dynamically expose or remove one or more LUs. As described herein, Site I 100a and Site II 100b may each behave simultaneously as a production site and a backup site for different logical units. As such, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. Protection agents 144 and 164 may intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands differently, according to the type of the command. For example, a SCSI command inquiring about the size of a certain LU may be sent directly to that LU, whereas a SCSI write command may be split and sent first to a DPA within the host's site.

A protection agent may change its behavior for handling SCSI commands, for example as a result of an instruction received from the DPA. For example, the behavior of a protection agent for a certain host device may depend on the behavior of its associated DPA with respect to the LU of the host device. When a DPA behaves as a source site DPA for a certain LU, then during normal course of operation, the associated protection agent may split I/O requests issued by a host to the host device corresponding to that LU. Similarly, when a DPA behaves as a target device for a certain LU, then during normal course of operation, the associated protection agent fails I/O requests issued by host to the host device corresponding to that LU.

Communication between protection agents 144 and 164 and a respective DPA 112 and 124 may use any protocol suitable for data transfer within a SAN, such as fiber channel, SCSI over fiber channel, or other protocols. The communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
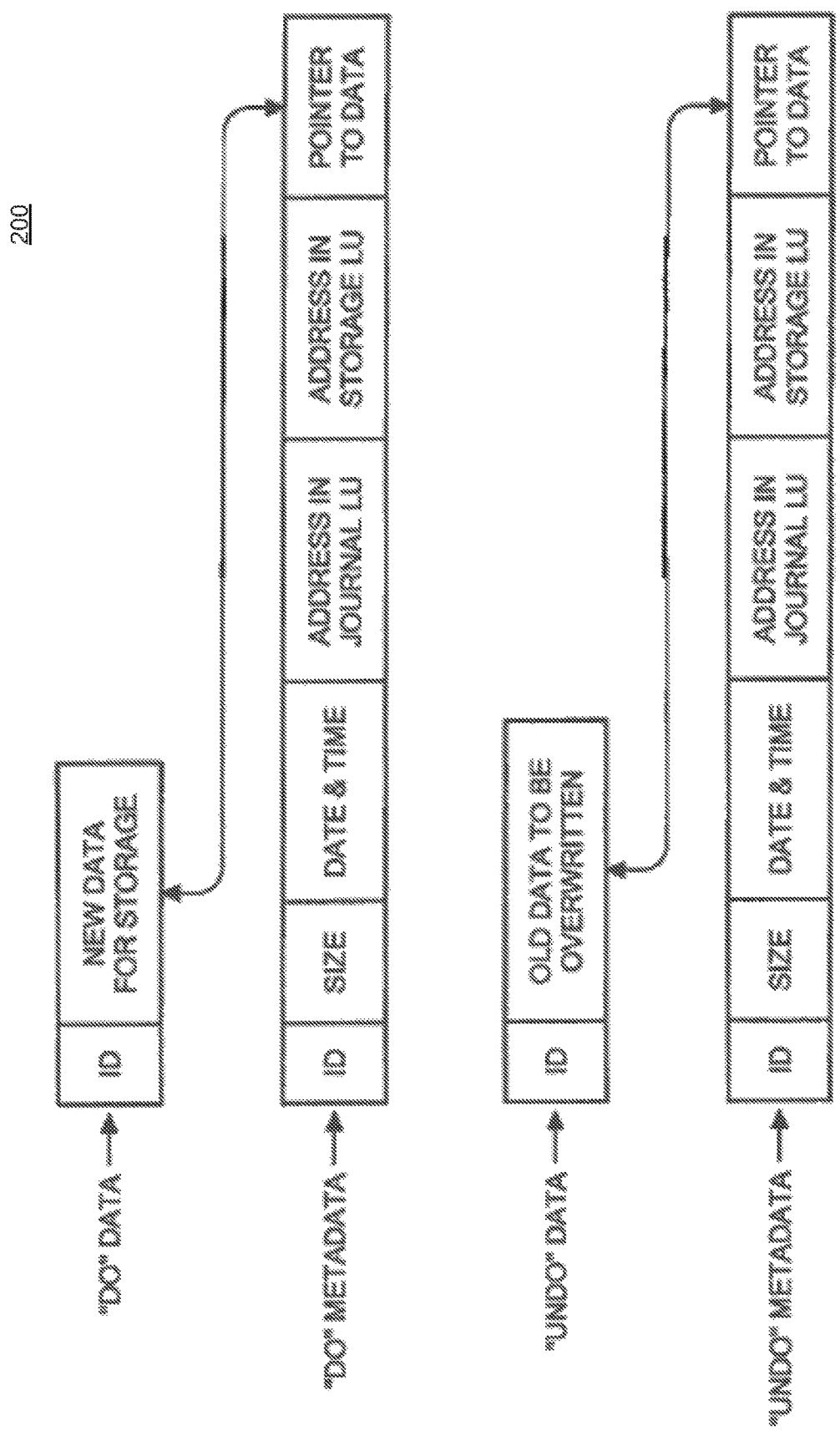
FIG. 2 is a diagram illustrating a journal history of write transactions for the data protection system of FIG. 1, in accordance with an illustrative embodiment.

As shown in the example embodiment shown in FIG. 1, target storage system 120 may expose a journal LU 176 for maintaining a history of write transactions made to LU B 156, referred to herein as a "journal." A journal may be used to provide access to storage at specified points-in-time (PITs), as discussed in greater detail in regard to FIG. 2. In some embodiments, the journal may be stored across multiple LUs (e.g., using striping, etc.). Target DPA 124 may include a journal processor 180 for managing the journal within journal LU 176.

In some embodiments, journal processor 180 may manage the journal entries of LU B 156. For example, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference. Other embodiments may not employ thin devices and tracking regions for replication, and may instead replicate write transactions using an array's native snapshot capabilities.

Some embodiments of data protection system 100 may be provided as physical systems for the replication of physical LUs, or as virtual systems for the replication of virtual LUs. For example, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In normal operation (sometimes referred to as "production mode"), described embodiments of DPA 112 may act as a source DPA for LU A 136. Thus, protection agent 144 may act as a source protection agent, specifically by splitting I/O requests to host device 140 ("Device A"). Protection agent 144 may send an I/O request to source DPA 112 and, after receiving an acknowledgement from source DPA 112, may send the I/O request to LU A 136. After receiving an acknowledgement from storage system 108, host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. When applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In synchronous mode, source DPA 112 may send each write transaction to target DPA 124, may receive back an acknowledgement from the target DPA 124, and in turn may send an acknowledgement back to protection agent 144. Protection agent 144 may wait until receipt of such acknowledgement before sending the I/O request to LU 136.

In asynchronous mode, source DPA 112 may send an acknowledgement to protection agent 144 upon receipt of each I/O request, before receiving an acknowledgement back from target DPA 124.

In snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. Source DPA 112 may send an acknowledgement to protection agent 144 upon receipt of each I/O request, before receiving an acknowledgement back from target DPA 124.

As described herein, a snapshot replica may be a differential representation of a volume. For example, the snapshot may include pointers to the original volume, and may point to log volumes for locations of the original volume that store data changed by one or more I/O requests. Snapshots may be combined into a snapshot array, which may represent different images over a time period (e.g., for multiple PITs).

As described herein, in normal operation, LU B 156 may be used as a backup of LU A 136. As such, while data written to LU A 136 by host 104 is replicated from LU A 136 to LU B 156, target host 116 should not send I/O requests to LU B 156. To prevent such I/O requests from being sent, protection agent 164 may act as a target site protection agent for host device B 160 and may fail I/O requests sent from host 116 to LU B 156 through host device B 160. In a recovery mode, target DPA 124 may undo the write transactions in journal LU 176 so as to restore the target storage system 120 to an earlier state.

Referring to FIG. 2, an illustrative write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, transaction 200 may correspond to a transaction transmitted from source DPA 112 to target DPA 124. In some embodiments, target DPA 124 may record write transaction 200 in the journal that includes four streams. For example, a first stream, referred to as a "DO" stream, may include a copy of the new data for writing to LU B 156. A second stream, referred to as a "DO METADATA" stream, may include metadata for the write transaction, such as an identifier, a date and time, a write size, the offset within LU B 156 where the new data is written, and a pointer to the offset in the DO stream where the corresponding data is located. A third stream, referred to as an "UNDO" stream, may include a copy of the data being overwritten within LU B 156 (referred to herein as the "old" data). A fourth stream, referred to as an "UNDO METADATA" stream, may include an identifier, a date and time, a write size, a beginning address in LU B 156 where data was (or will be) overwritten, and a pointer to the offset in the UNDO stream where the corresponding old data is located.

In such embodiments, since the journal contains the "undo" information necessary to rollback storage system 120, data that was stored in specific memory locations at a specified point in time may be obtained by undoing write transactions that occurred subsequent to such point in time (PIT). Each of the four streams may hold a plurality of write transaction data. As write transactions are received dynamically by the target DPA, the write transactions may be recorded at the end of the DO stream and the end of the DO METADATA stream, prior to performing the transaction.

In some embodiments, a metadata stream UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. Validating data replicas can be important, for example, in data replication systems employing incremental backup where an undetected error in an earlier data replica may lead to corruption of future data replicas.

In some conventional systems, validating data replicas can increase the journal lag for a transaction, which may increase a recovery time objective (RTO) of the data protection system (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Figure 3:
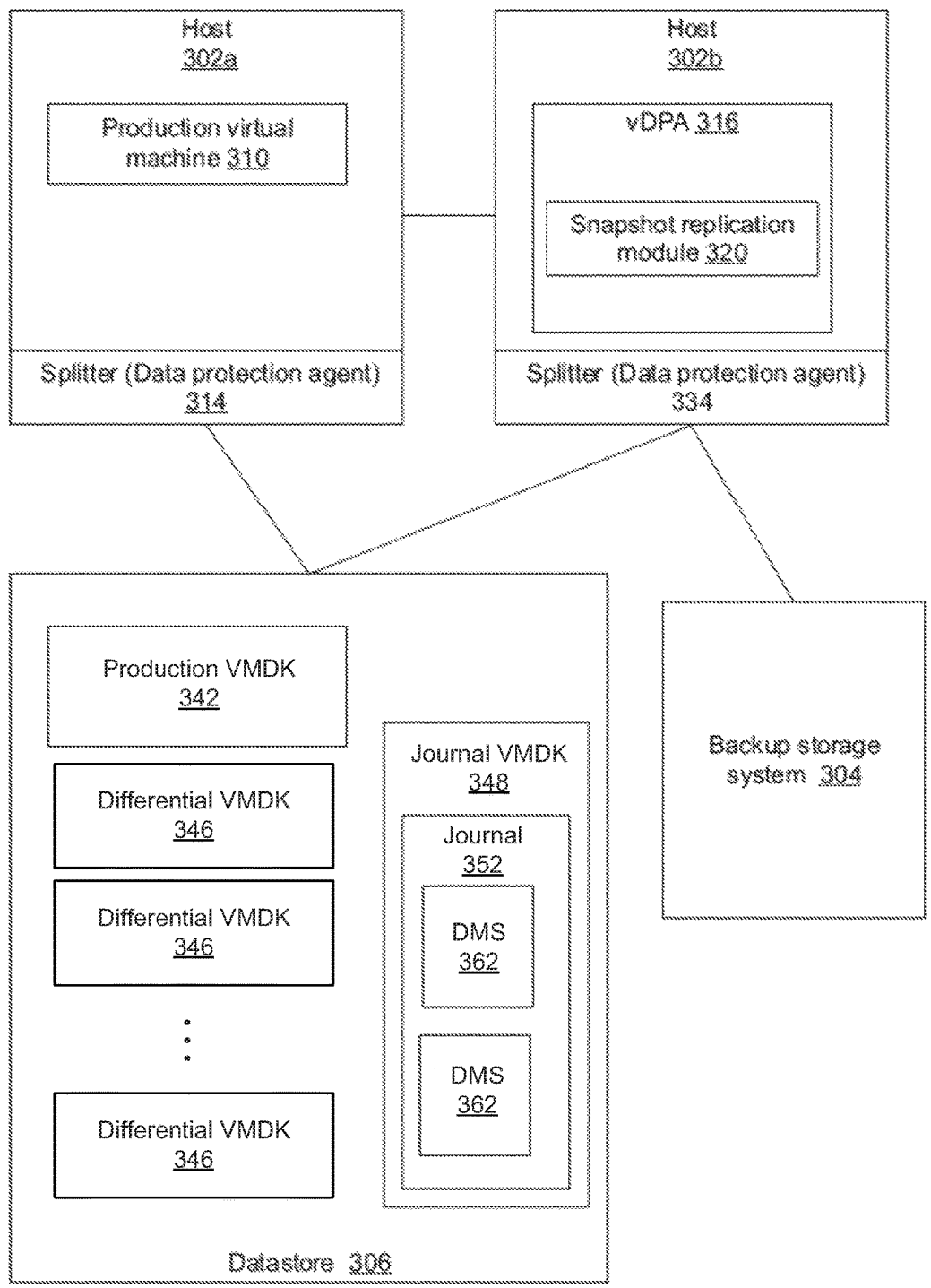
FIG. 3 is a block diagram of an example of a data protection system to perform snapshot replication on a storage system not configured to support snapshot replication, in accordance with an illustrative embodiment.

Referring to FIG. 3, in an illustrative embodiment, data protection system 300 may include host 302a, host 302b, backup storage system 304 (e.g., a deduplicated storage system) and a datastore 306. Host 302a may include production virtual machine 310 and splitter 314 (e.g., data protection agent 144 of FIG. 1). Host 302b may be a hypervisor and splitter 314 may operate either in the hypervisor kernel or in another layer in the hypervisor, which allows splitter 314 to intercept I/O requests sent from host 302a to one or more virtual machine disks (VMDKs) 342. Host 302b may include a virtual data protection appliance (e.g., DPA appliance 124 of FIG. 1) having snapshot replication module 320 and splitter 334 (e.g., data protection agent 164 of FIG. 1). Splitter 334 of host 302b enables protection of virtual machines on the host 302b. Splitter 334 of host 302b may also provide faster access to VMDKs 342 from virtual DPA (vDPA) 316.

As shown in FIG. 3, datastore 306 may include one or more production virtual machine disks, shown as production VMDK 342, and one or more differential virtual machine disks, shown as differential VMDKs 346. Some embodiments of datastore 306 may also include journal virtual machine disk 348. In other embodiments, differential VMDKs 346 and journal VMDK 348 may be stored in a first datastore, and production virtual machine disk 342 may be stored in a separate datastore so that I/O accesses to the differential VMDKs does not affect performance of the production VMDKs.

The differential VMDKs 346 may be used to store differential snapshot data representative of changes that happened to data stored on production VMDK 342. In one example, a first differential VMDK 346 may include changes due to writes that occurred to production VMDK 342 from time t1 to time t2, a second differential VMDK 346 may include the changes due to writes that occurred to production VMDK 342 from time t2 to time t3, and so forth.

In some embodiments, differential VMDKs 346 may be thin provisioned. In such embodiments, thin provisioning may allocate storage space to volumes of a SAN in a flexible manner among multiple volumes based on a minimum space requirement for each volume at any given time.

In some embodiments, data protection system 100 may include one or more consistency groups. A consistency group may treat source volumes (e.g., production volumes) and target volumes (e.g., backup volumes) as a single logical entity for data replication and migration.

Journal 352 may be stored in journal VMDK 348. In some embodiments, journal 352 includes one or more delta marker streams (DMS) 362. Each DMS 362 may include metadata associated with data that may be different between one differential VMDK and another differential VMDK. In one example, DMS 362 may include metadata differences between a current copy of the production VMDK 342 and a copy currently stored in backup storage 304. In some embodiments, journal 352 does not include the actual data changes, but rather metadata associated with the changes. In some embodiments, the data of the changes may be stored in the differential VMDKs. Thus, some embodiments may operate employing thin volumes to perform data replication by tracking regions for replications with the thin devices, as described herein. Other embodiments may operate to replicate data directly (e.g., without employing thin devices) from a source storage to a target (or replica) storage.

Although not shown in FIG. 3, in some embodiments, host 302b, datastore 306 and backup storage system 304 may be integrated into a single device, such as an integrated protection appliance to backup and protect production data.

As described here, data protection systems may employ continuous replication and/or snapshot replication to protect production data. For example, in continuous replication, every write I/O to a production volume is intercepted and sent to both the production volume and a replica volume. Thus, continuous replication may provide a very low Recovery Point Objective (RPO), meaning that data on a replica volume lags data on the production volume by only a short time period (e.g., a few seconds). RPO may be an amount of data that the user is willing to lose in case of production disaster (e.g., an amount of time between replications). At the extreme case, synchronous continuous replication may provide an RPO of zero (e.g., data on the replica volume is the same as data on the production volume). Further, continuous replication may provide high granularity of points in time (PITs) for restoring a production volume (e.g., since continuous replication may generate a replica each time there is a write operation to the production volume).

In continuous replication, data is sent to the replica "inline" (e.g., as part of the write operation), thus, in continuous replication it may be unnecessary to read data from the production volume to generate a replica. However, since every write operation sent to the production volume is also sent to the replica volume, network bandwidth requirements of continuous replication can be high (e.g., as high as the bandwidth of peak writes to the production volume).

In snapshot replication, snapshot replicas of a production volume are periodically generated after a time interval (e.g., the snapshot interval), and changes in data may be tracked between consecutive snapshot replicas. For example, one or more write operations may modify data on the production volume between generation of snapshot replicas. In some embodiments, regions of the production volume that are modified, and the changed data written to the regions, may be tracked. When a new snapshot replica is generated, modified regions may be read from the production volume and sent to the replica volume.

If there were numerous overwrites to the same region during a given snapshot interval, these changes may be "batched" or "folded" such that only the final content of the region is sent to the replica volume. In such embodiments, the bandwidth required for snapshot replication can be lower than then bandwidth required for continuous replication since less data is sent to the replica volume. However, this reduction in required bandwidth may be at the expense of providing longer RPOs than continuous replication and, thus, larger granularity of PITs that can be recovered (e.g., the lag between replicas may be large, for example, several minutes or hours). Further, snapshot replication may require storage space to track changes between snapshots and reading modified data from the production volume, which may delay user access to the production volume. Some embodiments may employ a hybrid replication mode that combines elements of snapshot replication and elements of continuous replication, for example, as described in U.S. patent application Ser. No. 15/274,362 entitled "Hybrid Continuous and Snapshot Replication in a Storage System" filed on Sep. 23, 2016 and U.S. patent application Ser. No. 15/275,677 entitled "Multilevel Snapshot Replication for Hot and Cold Regions of a Storage System" filed on Sep. 26, 2016, both of which are assigned to EMC IP Holding Company LLC, and both of which are hereby incorporated by reference herein. Such hybrid replication may perform continuous replication for some regions of the production volume and snapshot replication for other regions of the production volume, for example based upon usage characteristics of the regions (e.g., based on how often the region is accessed, a priority associated with the region, etc.).

Storage volumes, such as storage 108 and 120 of FIG. 1, may typically be arranged into one or more segments or blocks. For example, a given storage volume may include a plurality of physical blocks. A physical block may be an addressable unit where data may be written to and/or read a sector or a page may be a smallest addressable unit of a volume). A logical block may include one or more contiguous (or consecutive) physical blocks. In an illustrative embodiment, each block may be an 8KB page, although other sizes may be employed, such as a 512 byte sector, 2KB or 4KB pages, or other sizes. Thus, some storage volumes may support fixed-size (e.g., 8KB) data blocks starting at address 0. An aligned write request would then have a size that is an integer multiple of the block size (e.g., an integer multiple of 8KB) and has a starting address offset) that is aligned to an integer multiple of the block size (e.g., an integer multiple of 8KB). An unaligned write request might start at a starting address (e.g., offset) that is not aligned to an integer multiple of the block size and/or have a size that is not an integer multiple of the block size.

Many storage systems process write requests that are aligned to segment or block boundaries of the storage media faster than write requests that are not aligned to the segment or block boundaries of the storage media. Described embodiments employ a hybrid replication technique to replicate aligned write requests using continuous replication, since the aligned write requests can be written by the storage media quickly. Unaligned write requests are replicated using snapshot replication, since the unaligned write requests may take longer to be written by the storage media and there is an opportunity for multiple I/Os to the same segments or blocks to be coalesced into a single snapshot.

Thus, described embodiments may reduce the workload for a replication storage media (e.g., target side storage 120 of FIG. 1) in systems having arbitrary, unaligned write patterns. Reducing the replication storage media workload may improve overall performance of data protection system 100. Further, aligned write patterns are replicated continuously, providing low RPO and high granularity of data recovery (e.g., PITs). As a result, described embodiments may enable continuous replication to storage arrays that cannot handle the processing requirements of continuous replication for unaligned write requests, thus reducing write overhead and latency on the array. Described embodiments may be employed on systems that do not natively support snapshot replication (e.g., as shown in FIG. 3) or systems that have native snapshot support. Further, described embodiments may be employed in conjunction with hybrid replication that performs continuous replication for some regions of the production volume and performs snapshot replication for other regions of the production volume, for example based upon usage characteristics of the regions (e.g., based on how often the region is accessed, a priority associated with the region, etc.).

As will be described, when a write request is intercepted by production site splitter (e.g., by source side protection agent 144 of FIG. 1) and sent to the replication site (e.g., target site 100b), the data protection appliance (e.g., source DPA 112) may determine the alignment of the write request. When the edges of the data of the write request (e.g., the starting offset and the ending offset or length of the write request) are not aligned to the boundaries of the storage media, the data protection appliance (e.g., source DPA 112) may trim or otherwise segment the data of the write request to make the write request into at least one aligned portion and at least one unaligned portion. The aligned portion(s) of the data of the write request may be replicated continuously, while the unaligned portion(s) may be marked as dirty data in a dirty data indicator structure associated with segments of the production and/or replication volumes (e.g., source side storage 108 and/or target side storage 120).

The unaligned portions are marked as dirty regions in the he dirty data indicator structure, and are replicated using snap based replication. As described herein, a snapshot replica may be generated and sent to the replication site at a given snapshot interval. The dirty data indicator structure may thus be created (or reset) at the beginning of each snapshot interval, and indicate portions of the storage volume that are modified by unaligned data. For example, when the DPA receives a new write request, aligned portions of the new write request are replicated continuously and any corresponding dirty regions in the dirty data indicator structure are cleared (e.g., the new write request caused the previously dirty data to become out of date). Thus, in some embodiments, the only regions in the dirty data indicator structure are regions that remain dirty at the end of the snapshot interval are regions most recently accessed by an unaligned write request.

In one embodiment, the dirty data indicator may be implemented as a bitmap having a plurality of indicators (e.g., bits) each associated with a given portion of the storage volume. For example, the dirty data indicator structure may be implemented as a dirty data bitmap where individual bits of the bitmap are associated with byte ranges smaller than the alignment size (e.g., the block size) of the storage media. As an example, if the alignment size is 8KB, the dirty data bitmap may include bits associated with data segments at increments less than 8KB, for example for every 512 bytes of data. Alternatively, for example to reduce memory required to store the dirty data bitmap, instead of allocating a bit for every alignment size (or at ranges smaller than the alignment size), a bit could instead be associated with a multiple of the alignment size. For example, if the alignment size is 8KB, the dirty data bitmap may allocate a bit for every 32KB (or other multiple) segment of the storage volume. In embodiments employing a bitmap as the dirty data indicator, the size of the byte ranges tracked by each bit may be configured at startup (e.g., at startup of the DPA). As an alternative to using a bitmap, in some embodiments, the DPA may track byte ranges of the dirty data instead of tracking individual segments of the storage volume. Such an approach may use less memory than a bitmap in systems where unaligned write requests are infrequent, and can dynamically adjust the size of the tracking segments, for example to track arbitrarily small dirty ranges, such as down to a single byte.

In one illustrative embodiment where the storage media employs and 8KB alignment or block size, if there is write request from address 7KB to address 16KB-1, then the aligned data portion from 8KB to 16KB-1 may be continuously replicated to the replication site, while the unaligned data portion from 7KB to 8KB-1 may be marked as dirty in an associated indicator of the dirty data indicator structure and (potentially) replicated to the replication site in a later snapshot replication. In the event there is an aligned write request to addresses 0 to 8KB-1 before snapshot replication takes place, the new aligned write request may be replicated continuously, and the dirty data indicator for the previous unaligned write request may be cleared (e.g., the data can be marked as clean) since replication of the unaligned write request is no longer needed. In the event there is another unaligned write request to addresses 7KB to 8KB-1, then only the most recent unaligned write request might be sent in the snapshot replication. Thus, described embodiments reduce replication of unaligned write requests and also reduce network bandwidth since only the latest write data is transferred.

Figure 4:
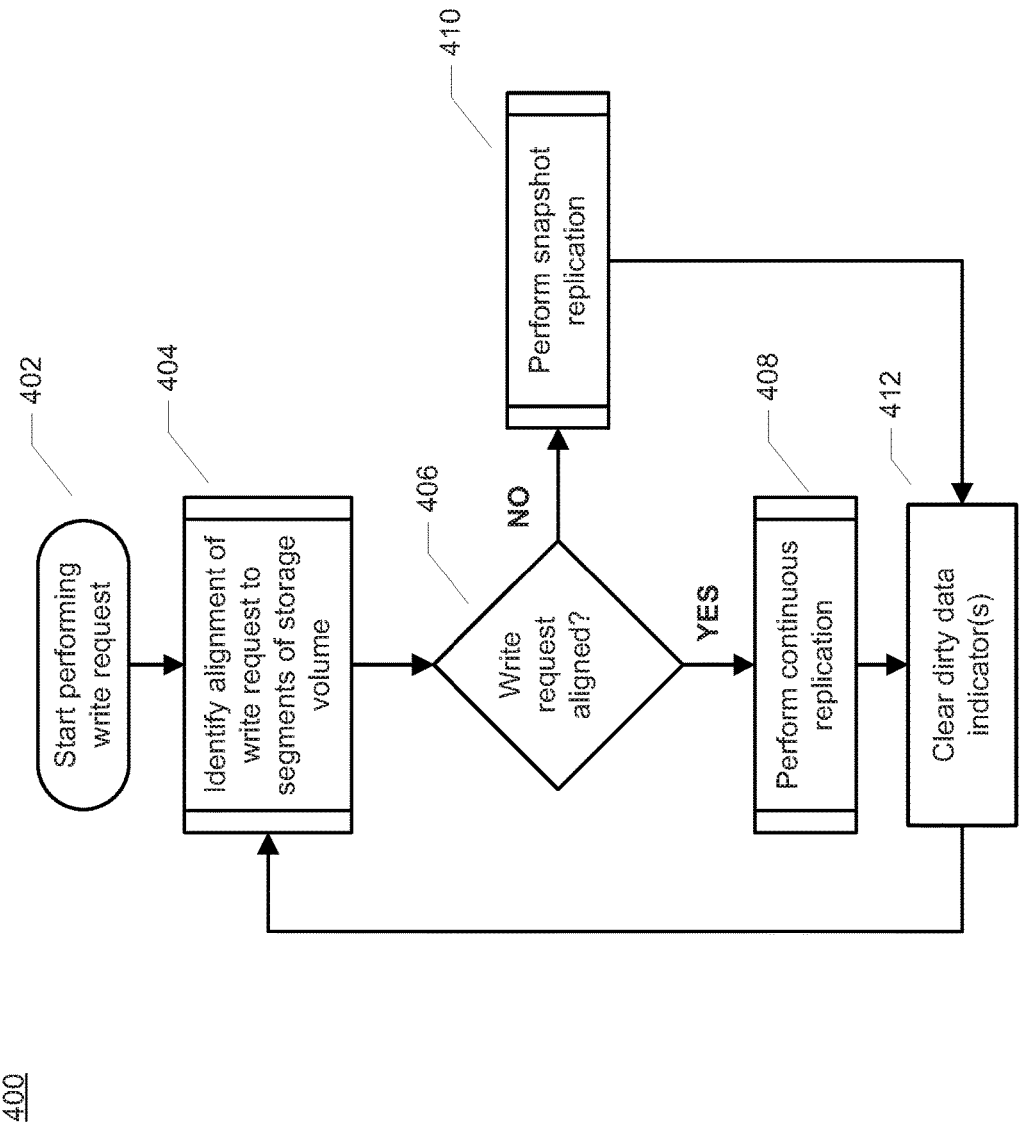
FIG. 4 is a flow diagram of an illustrative process to perform a write request to a production volume of a data protection system, in accordance with an illustrative embodiment.

Referring to FIG. 4, a flowchart is shown for an illustrative process, 400, for performing write requests to a production volume. In various embodiments, process 400 may be performed by the protection agent (e.g., protection agent 144 of FIG. 1) or by the data protection appliance (e.g., source DPA 112 of FIG. 1 or DPA 314 of FIG. 3) associated with the production volume. Referring back to FIG. 4, at block 402, process 400 begins. For example, process 400 may begin at block 402 when the DPA receives a write request. At block 404, the DPA may identify whether the write request is aligned (or partially aligned) to the aligned to the boundaries of the storage media. Block 404 is described in greater detail in regard to FIG. 5. At block 406, if the write request is aligned (or partially aligned), at block 408, the aligned write request (or aligned portion(s) of the write request) are replicated continuously to the replication site. At block 412, dirty data indicators associated with segments written by the continuous replication are cleared, since the most recent data has been written to the segments. Process 400 may return to block 404 to process subsequent write requests (or portions of write requests).

At block 406, if the write request is not aligned (or a portion of the write request is unaligned), then at block 410, the unaligned write request (or unaligned portion(s) of the write request) are replicated using snapshot replication to the replication site. At block 412, dirty data indicators associated with segments written by the snapshot replication are cleared, since the most recent data has been written to the segments. Process 400 may return to block 404 to process subsequent write requests (or portions of write requests).

Figure 5:
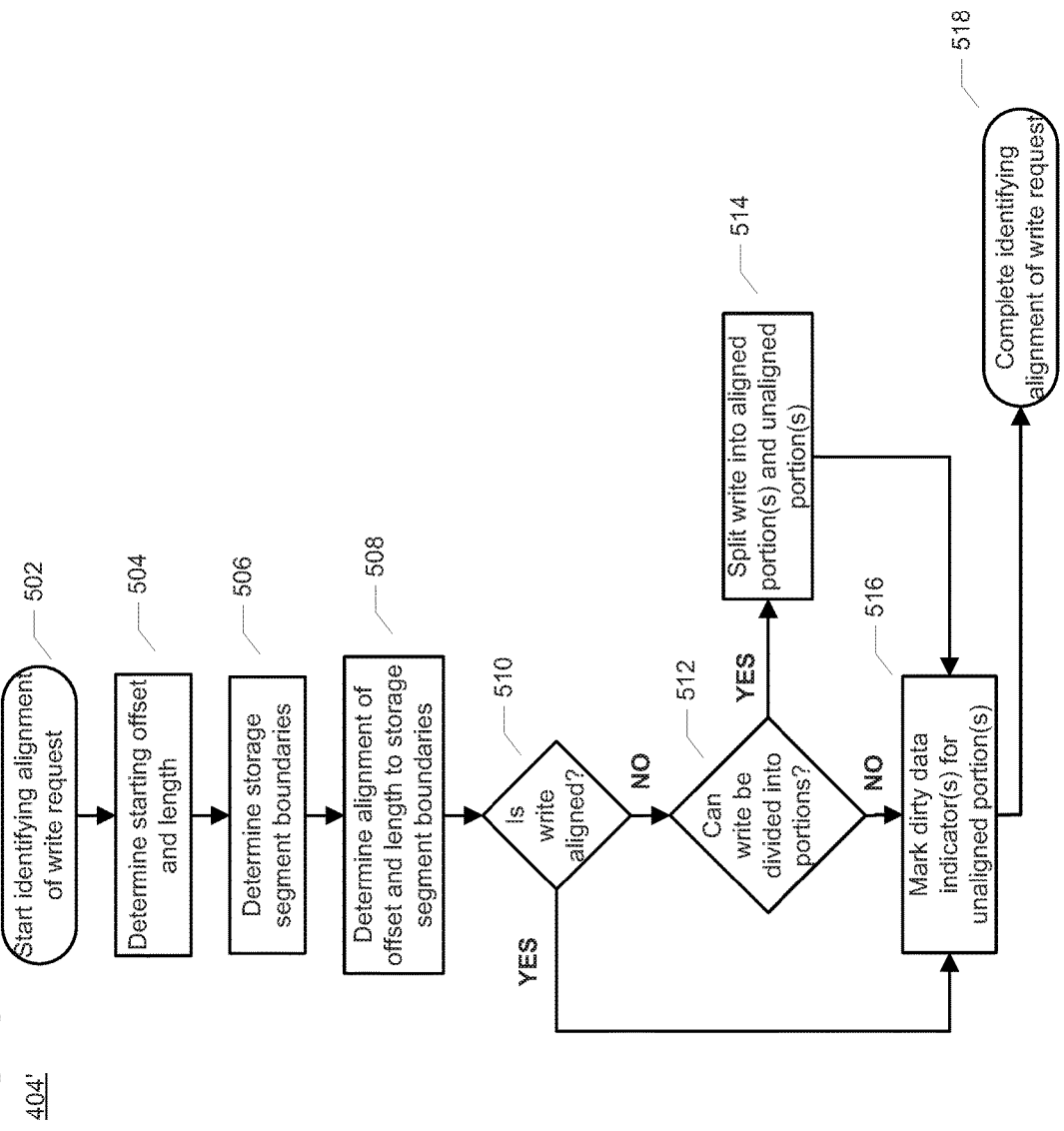
FIG. 5 is a flow diagram of an illustrative process to identify aligned portions of write requests, in accordance with an illustrative embodiment.

Referring to FIG. 5, additional detail of block 404 is shown as illustrative process 404'. At block 502, process 404' begins. At block 504, a starting offset and length (or starting offset and ending offset) are determined for a write request. At block 506, the storage segment boundaries of the storage media are determined, for example, the page size, block size or sector size may be determined. At block 508, the storage segment boundaries and offsets are compared to determine, at block 510, whether the write request is aligned or unaligned. At block 510, if the write request is aligned, then process 404' completes at block 518 (e.g., to perform continuous replication at block 408 of FIG. 4).

At block 510, if the write request is not aligned, then at block 512, it is determined whether the write request can be divided into at least one aligned portion and one or more unaligned portions. At block 512, if the write request cannot be divided into at least one aligned portion, then process 404' proceeds to block 516. At block 512, if the write request can be divided into at least one aligned portion, then at block 514, the write request is split such that at least one aligned portion is created (e.g., that can be replicated continuously at block 408 of FIG. 4). One or more remainder unaligned portions may also be created. At block 516, the dirty data indicators are set for the one or more unaligned portions of the write request (e.g., to be replicated via snapshot replication at block 410 of FIG. 4). At block 518, process 404' completes.

Referring to FIG. 6A, an illustrative dirty data bitmap 600 is shown. As shown in FIG. 6A, a given dirty data bitmap may include a dirty indicator (e.g., a hit) associated with each region (or a group of regions) of the storage media. If an unaligned write request (or unaligned portion of a write request) writes to region 2, for example, then dirty indicator 2 is set until either (1) region 2 is overwritten by an aligned write request that is continuously replicated, or (2) the snapshot interval is reached and the dirty data is replicated as a snapshot, for example at block 412 of FIG. 4.

Referring to FIG. 6B, an illustrative dirty data tracking structure 601 is shown. As shown in FIG. 6B, as an alternative to using a bitmap, in some embodiments, the DPA may track byte ranges of the dirty data instead of tracking individual segments of the storage volume. For example, as shown, dirty data tracking structure may include a starting offset and ending offset for one or more unaligned write requests during a given snapshot interval. Thus, since the starting and ending offsets are tracked for each write request, dirty data tracking structure 601 could track arbitrarily sized dirty ranges, such as down to a single byte or over several megabytes, etc.

In some embodiments, variations and combinations of the illustrative dirty data tracking structures shown in FIGS. 6A and 6B may be employed. For example, a system may dynamically switch between dirty data bitmap 600 and dirty data tracking structure 601 based upon operating conditions of the storage system. For example, the storage system may begin with either a dirty data bitmap or dirty byte range structure and then determine it would be more efficient to switch to the other structure. A transformation process can be run to convert from one structure to the other. In such a system, when converting from a dirty byte range to a dirty data bitmap, byte ranges may be rounded (e.g., up or down) to the unit size represented by a bit in the bitmap. As another example, the storage media may be logically partitioned such that certain partitions are represented by a first dirty data tracking structure while other partitions are represented by a second dirty data tracking structure. Such arrangements may reduce memory requirements for dirty data tracking or better correspond to write patterns of the storage media.

Figure 7:
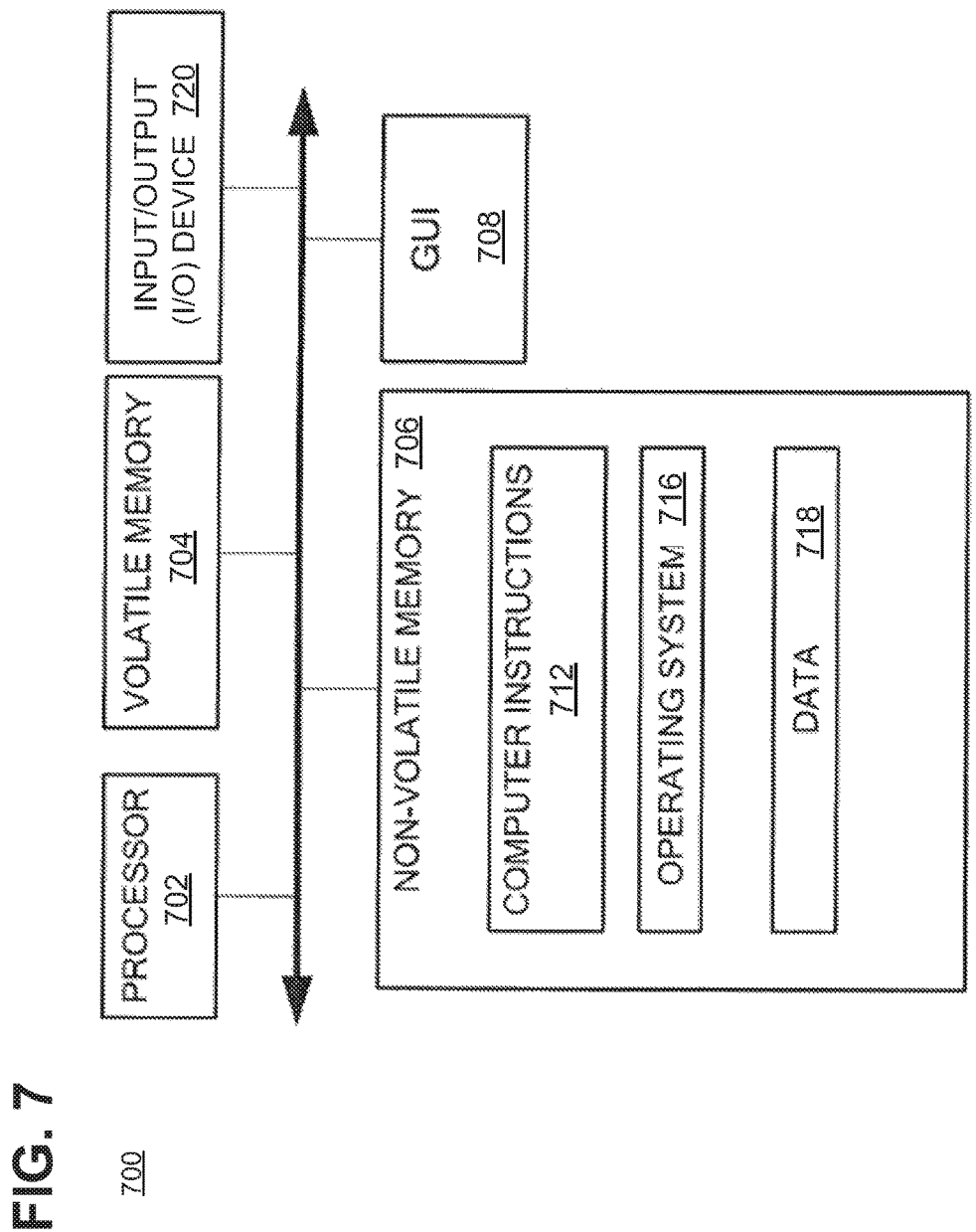
FIG. 7 is a block diagram of an example of a hardware device that may perform at least a portion of the processes in FIGS. 4 and 5.

In some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 7. As shown in FIG. 7, computer 700 may include processor 702, volatile memory 704 (e.g., RAM), non-volatile memory 706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704 to perform at least a portion of the processes shown in FIGS. 4 and 5. Program code may be applied to data entered using an input device of GUI 708 or received from I/O device 720.

The processes described herein are not limited to use with the hardware and software of FIG. 7 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, the processes described herein are not limited to the specific processing order described. Rather, any of the blocks of the processes may be re-ordered, combined or removed, performed in parallel or in serial, as necessary, to achieve the results set forth herein.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will he further understood that various changes in the details, materials, and arrangements of the parts that have been described and illustrated herein may be made by those skilled in the art without departing from the scope of the following claims.

We claim:

1. A method comprising:
   receiving a write request for a data set to be written to a production volume, the production volume including a plurality of addressable units that have a same size, the write request identifying a starting location in the production volume where the data set is to be written;
   detecting whether the data set is aligned with the production volume based on the starting location identified by the write request and the size of the addressable units in the production volume;
   when the data set is aligned with the production volume, copying the entire data set to a replication site associated with the production volume by using continuous replication; and
   when the data set is not aligned with the production volume, copying at least a portion of the data set to the replication site associated with the production volume by using snapshot replication.

2. The method of claim 1, wherein each of the addressable units comprises an addressable storage block of the production volume.

3. The method of claim 1, wherein storing at least a portion of the data set using snapshot replication comprises, at completion of a given snapshot interval, copying at least a portion of the data set as a snapshot replica to the replication site associated with the production volume.

4. The method of claim 1, wherein detecting whether the data set is aligned with the production volume includes detecting that the data set is aligned with the production volume when a size of the data set is an integer multiple of the size of the addressable units in the data set.

5. The method of claim 1, wherein copying at least a portion of the data set to the replication site associated with the production volume by using snapshot replication includes:
   identifying a first portion of the data set that is aligned with the production volume and a second portion of the data set that is not aligned with the production volume, and
   copying the first portion of the data set to the replication site using continuous replication, and
   copying the second portion of the data set to the replication site.

6. The method of claim 1, further comprising, when the data set is not aligned with the production volume,
   setting one or more dirty data indicators associated with the write request.

7. The method of claim 1, further comprising, when the data set is aligned with the production volume,
   clearing one or more dirty data indicators associated with addressable units overwritten by the write request.

8. The method of claim 1, wherein the write request is received during a given operational time window, and the snapshot replication is completed at an end of the given operational time window, when the data set is not aligned with the production volume.

9. A system comprising:
   a processor; and
   memory storing computer program code that when executed on the processor causes the processor to operate a storage system, the storage system operable to perform the operations of:
   receiving a write request for a data set to be written to a production volume, the production volume including a plurality of addressable units that have a same size, the write request identifying a starting location in the production volume where the data set is to be written;
   detecting whether the data set is aligned with the production volume based on the starting location identified by the write request and the size of the addressable units in the production volume;
   when the data set is aligned with the production volume, copying the entire data set to a replication site associated with the production volume by using continuous replication; and
   when the data set is not aligned with the production volume, copying at least a portion of the data set to the replication site associated with the production volume by using snapshot replication.

10. The system of claim 9, wherein each of the addressable units comprises an addressable storage block.

11. The system of claim 10, wherein storing at least a portion of the data set using snapshot replication
   comprises, at completion of a given snapshot interval, copying at least a portion of the data set as a snapshot replica to a replication volume of the storage system.

12. The system of claim 9, wherein detecting whether the data set is aligned with the production volume includes detecting that the data set is aligned with the production volume when a size of the data set is an integer multiple of the size of the addressable units in the data set.

13. The system of claim 9, wherein, copying at least a portion of the data set to the replication site associated with the production volume by using snapshot replication includes:
   identifying a first portion of the data set that is aligned with the production volume and a second portion of the data set that is not aligned with the production volume,
   copying the first portion of the data set to the replication site by using continuous replication, and
   copying the second portion of the data set to the replication site by using snapshot replication.

14. The system of claim 9, wherein
   the storage system is further operable to perform the operation of, when the data set is not aligned with the production volume, setting one or more dirty data indicators associated with the write request.

15. A computer program product including a non-transitory computer readable storage medium having computer program code encoded thereon that when executed on a processor of a computer causes the computer to operate a storage system, the computer program product comprising:
    computer program code for receiving a write request for a data set to be written to a production volume, the production volume including a plurality of addressable units that have a same size, the write request identifying a starting location in the production volume where the data set is to be written;
    computer program code for detecting whether the data set is aligned with the production volume based on the starting location identified by the write request and the size of the addressable units in the production volume;
    computer program code for using continuous replication to copy the entire data set to a replication site associated with the production volume when the data set is aligned With the production volume; and
    computer program code for using snapshot replication to copy at least a portion of the data set to the replication site associated with the production volume when the data set is not aligned with the production volume.

16. The computer program product of claim 15, wherein each of the addressable units comprises an addressable storage block.

17. The computer program product of claim 15, wherein detecting whether the data set is aligned with the production volume includes detecting that the data set is aligned with the production volume when a size of the data set is an integer multiple of the size of the addressable units in the data set.

18. The computer program product of claim 15, wherein the computer program code for using snapshot replication to copy at least a portion of the data set to the replication site associated with the production volume when the data set is not aligned with the production volume comprises:
    computer program code for identifying a first portion of the data set that is aligned with the production volume and a second portion of the data set that is not aligned with the production volume,
    computer program code for copying the first portion of the data set to the replication site by using continuous replication, and
    computer program code for copying the second portion of the data set to the replication site by using snapshot replication.

19. The computer program product of claim 15, further comprising computer program code for setting one or more dirty data indicators associated with the write request.

\* \* \* \* \*